United States Patent [19]

Mason et al.

[11] 4,373,863
[45] Feb. 15, 1983

[54] FEED CONTROL SYSTEM FOR PUMPING FLUIDS TO DISHWASHERS AND THE LIKE

[76] Inventors: William L. Mason, 24782 Calle Vinetos, El Toro, Calif. 92630; William K. Russell, 2715 Sparrow Cir., Costa Mesa, Calif. 92626

[21] Appl. No.: 191,710

[22] Filed: Sep. 29, 1980

Related U.S. Application Data

[63] Continuation-in-part of Ser. No. 14,041, Feb. 22, 1979, Pat. No. 4,242,051.

[51] Int. Cl.³ .................... F04B 49/00; F04B 49/02
[52] U.S. Cl. ........................................ 417/12; 417/38
[58] Field of Search .................. 318/46, 87; 134/56, 134/57, 58; 417/12, 36, 63

[56] References Cited

U.S. PATENT DOCUMENTS

| | | | |
|---|---|---|---|
| 3,519,909 | 7/1970 | Mathias et al. | 318/46 |
| 3,667,022 | 5/1972 | Quinn | 417/36 X |
| 3,796,925 | 3/1974 | Breeding | 134/75 D X |
| 3,800,205 | 3/1974 | Zalar | 417/36 X |
| 3,896,827 | 7/1975 | Robinson | 134/56 D X |

OTHER PUBLICATIONS

Onjanow, N., "A-C Drive Offers System Design Flexibility", *Electro-Technology*, Dec. 1960, pp. 131–137.

*Primary Examiner*—William L. Freeh
*Attorney, Agent, or Firm*—Willie Krawitz

[57] ABSTRACT

A peristaltic detergent feed pump and peristaltic rinse feed pump are employed to supply their respective ingredients to a washing machine, chemical reactor, or the like.

The detergent feed is supplied by a peristaltic pump, and the amount of feed is detected by a sensor such as a conductance probe controlled by a special circuitry means.

The peristaltic rinse feed pump is driven by a shaded pole motor, comprising a constant torque, A.C. drive and a D.C. electromagnetic, shaded pole brake portion.

The net effect of employing a circuit controlled conductance sensor and D.C. brake enables the detergent and rinse ingredients to be fed linearly to the dishwasher.

11 Claims, 4 Drawing Figures

FEED CONTROL SYSTEM FOR PUMPING FLUIDS TO DISHWASHERS AND THE LIKE

BACKGROUND OF THE INVENTION

This invention is a continuation-in-part of U.S. patent application Ser. No. 014,041, filed Feb. 22, 1979, and entitled: "FEED CONTROL SYSTEM FOR PUMPING FLUIDS TO DISHWASHERS AND THE LIKE", and now U.S. Pat. No. 4,242,051.

The parent application, U.S. Ser. No. 014,041 concerned the use of a peristaltic pump for supplying to a dishwasher, fluids having a non-linear shear rate either separately or together. The pump was driven by a shaded pole, A.C. constant drive motor and a shaded pole, D.C. electromagnetic brake. Consequently, when pumping non-linear shear rate fluids, such as thixotropic fluids, as the shear rate decreased due to the pumping action, the tendency of the A.C. motor to speed up was counterbalanced by the D.C. brake being driven through an increasing flux. Hence, pumping rates of the non-linear shear rate fluids could be linearized in a reasonable fashion.

However, during the course of a dishwashing cycle, the washing and rinse steps usually are not carried out simultaneously, but are generally carried out at different times. Therefore, it is preferred to separate the pump functions so that one pump is used solely with detergent, and a separate pump supplies the rinse additives. This separation of functions would enable concentration detection and pumping of the detergent to be separated from the rinse additive operation which may employ a fluid of the non-linear shear rate type and which has different power and delivery requirements.

THE INVENTION

According to the invention, a feed system for supplying detergents and rinse additives to a washing machine and the like is provided which includes a level detection, feed supply and level alarm system for supplying at constant speed, detergent to the washing machine through a peristaltic pump; and, a peristaltic pump for supplying to the washing machine, rinse additives having non-linear (e.g. thixotropic) flow properties, the peristaltic pump being driven by a constant speed, A.C. motor and a D.C. electromagnetic brake, thereby linearizng the flow of rinse additives. An accuracy of about $\pm 1\%$–2% within linearity is imparted to both pumps when feeding linear and non-linear shear rate fluids at the rate of at least 1–10 ml/min.

DESCRIPTION OF THE PREFERRED EMBODIMENTS

Figure 1:
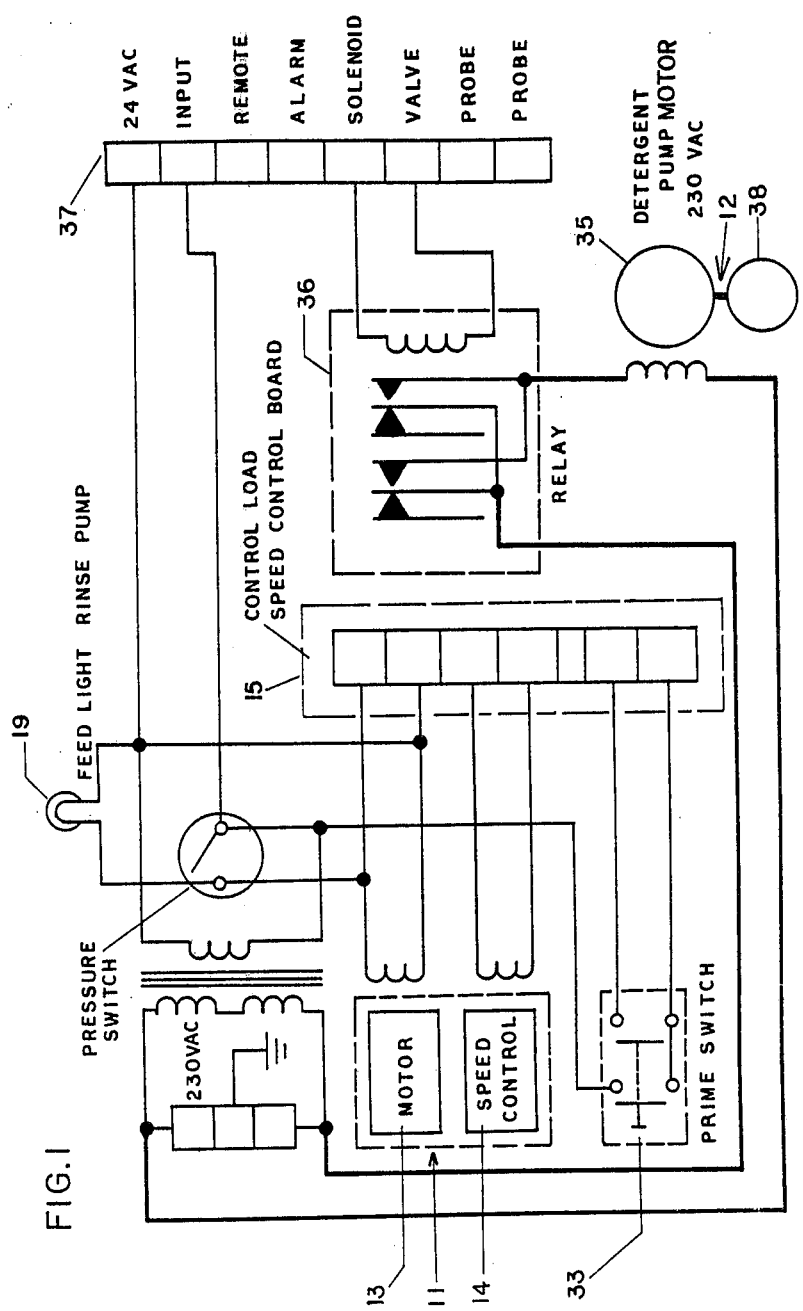
FIG. 1 is an overall schematic diagram showing the operation of the detergent pump and level sensor, and the rinse additive pump.

The wiring diagram of the feed control system 10 of this invention employing a rinse additive feed system 11 and detergent feed system 12 is shown in FIG. 1. The rinse system 11 includes a constant speed, A.C. shaded pole motor 13 connected to a D.C. motor 14 that acts as a brake on the A.C. motor. Details of the A.C. motor 13 and D.C. brake motor 14 are disclosed, infra, with specific reference to FIG. 2.

Power for the D.C. motor is obtained by rectifying a portion of the 230 VAC power supply. A speed control board 15 is shown which mounts a circuit for adjusting the A.C. motor speed for a given product, and the circuit is usually pre-set at installation to drive a peristaltic pump 16 at a pre-selected, constant speed using the D.C. brake. A pressure switch is employed to activate or turn off the rinse additive feed, and a prime switch 18 primes the system with fluid at the beginning of a cycle by overriding the D.C. brake motor 14. A feed light 19 is placed in the circuit to indicate when power is applied to the rinse pump.

Figure 2:
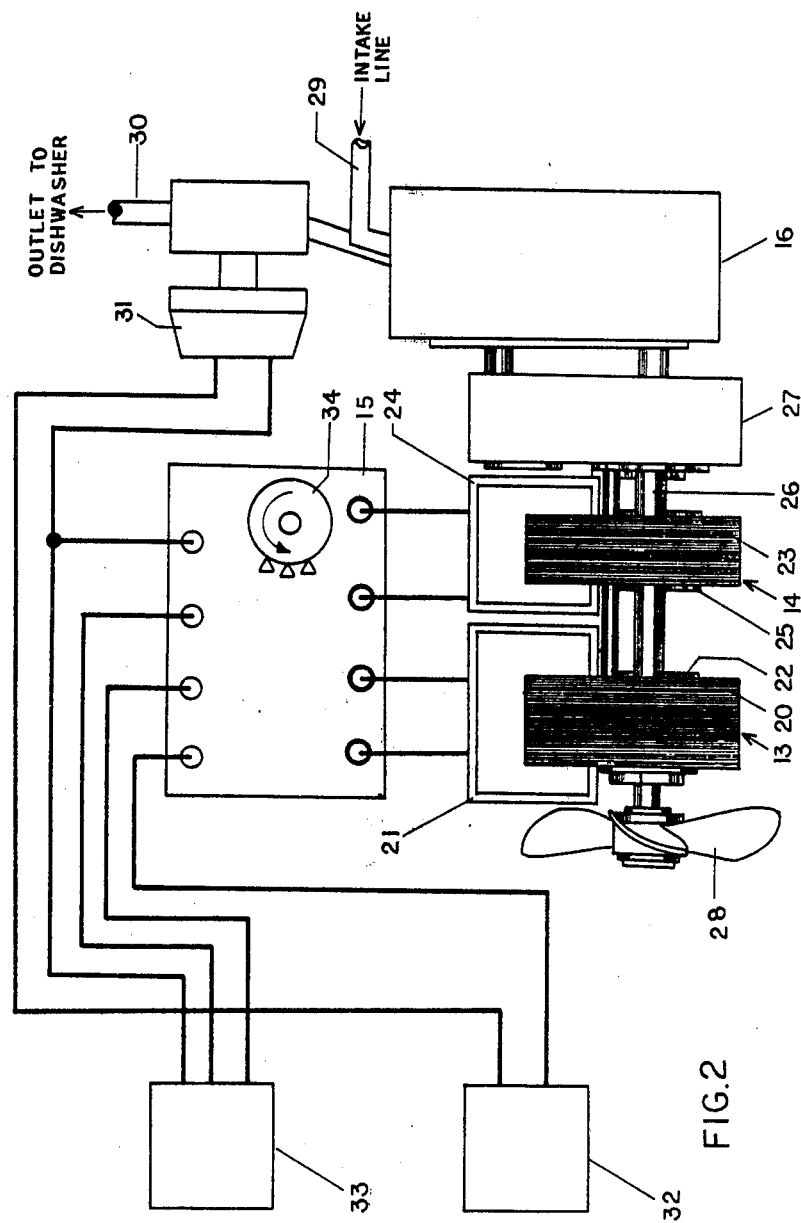
FIG. 2 shows a schematic of the feed pump and control system.

FIG. 2 illustrates a schematic of the feed control components of this invention. The constant torque, A.C. motor 13 includes a laminated core 20, winding 21 and rotor 22, while the variable speed, D.C. motor 14 includes a laminated core 23, winding 24 and rotor 25. A common drive shaft 26 is mounted by the rotors, one end of the shaft driving the peristaltic pump 16 through a gear reducer 27; at the other end, the shaft drives a cooling propellor 28.

An intake line 29 supplies rinse additive to the peristaltic feed pump 16, and an outlet line 30 feeds the pumped fluid to, say, a water inlet line (not shown) for supply to a dishwasher. The fluid is fed to the dishwasher usually at room temperature which typically, varies from about 65° F.–75° F. The rinse solution is supplied in the rinse cycle following detergent washing and usually employs isopropanol based materials; typical wash-rinse temperatures vary from about 160° F.–200° F.

Obviously, depending on the extent and timing of washing and rinsing desired, and the nature of the specific dishwashing equipment, fluids having both non-linear (e.g. thixotropic) and linear properties may be pumped simultaneously or separately by the peristaltic pump 16 at a constant rate.

A pressure swich 31 is employed to activate the pump and/or motors when the line 30 to the dishwasher becomes filled with water at the commencement of a cycle.

The circuit panel 15 is provided to mount circuit components including a speed control switch 34. This switch operates a variable resistance which acts as a potentiometer to set the A.C. motor speed for a given amount of product; the switch 34 is usually pre-set at installation.

A push button switch 32 is employed to activate or turn off the system, and a prime switch 33 primes the system with fluid at the beginning of a cycle of overriding the D.C. brake motor 14 due to flux cancellation.

In operation, when the power switch 32 and pressure switch 31 are closed, the A.C. motor will produce an initial power surge. When the prime switch is depressed, the brake motor will turn off and allow a momentary pressure build-up to prime fluid into the intake line 29. After pumping has commenced, the non-linear shear rate properties of the thixotropic fluid will cause a viscosity decrease, and hence, the force on the constant torque, A.C. motor 13 will decrease. However, the tendency of the A.C. motor to return to its original setting will be counterbalanced because it must drive the D.C. motor 14 through the flux field with increasing speed. Consequently, the fluid output rate is reasonably linear to within about ±1%-2%.

The detergent feed system 12 comprises an A.C. shaded pole motor 35 powered from the 230 VAC supply through a relay 36, as shown in FIG. 1 that is controlled from a micromho (i.e. a conductance probe) sensor 37 that will be described, infra, with reference to the circuit diagram of FIGS. 3 and 4. The A.C. motor 34 drives a peristaltic pump 38 which feeds detergent to the dishwasher.

Figure 3:
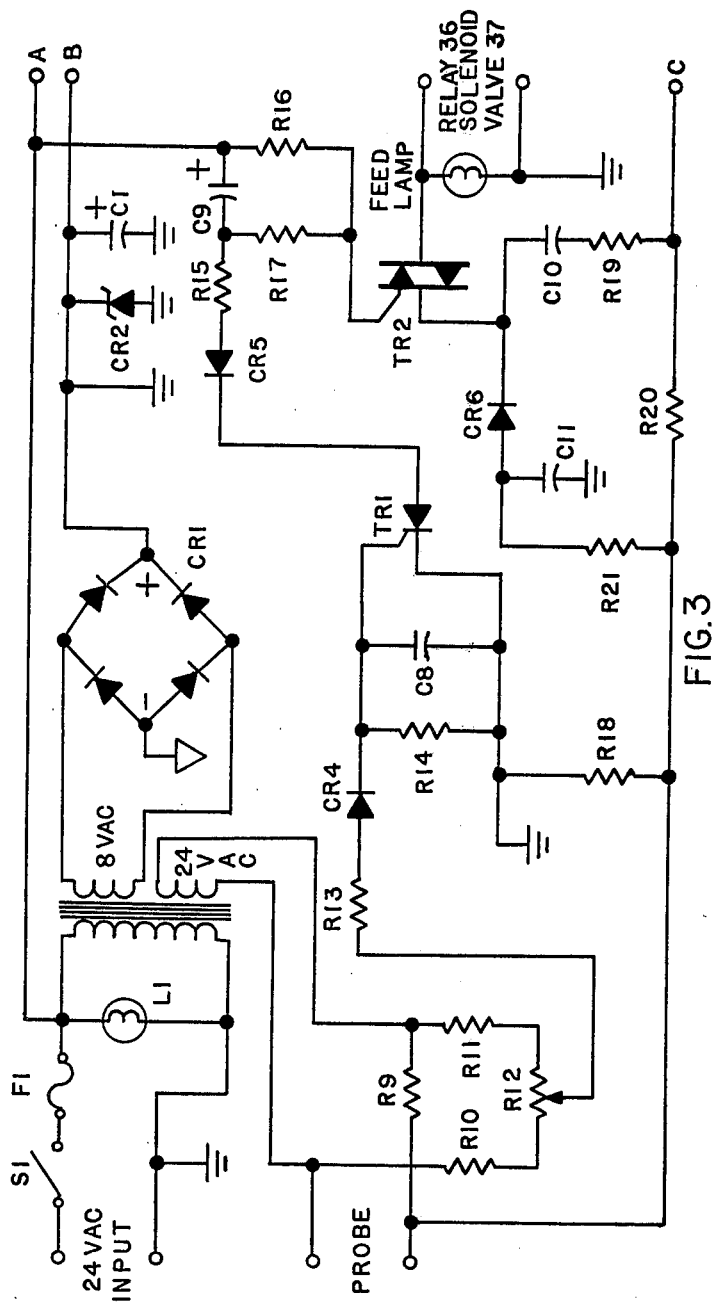
FIGS. 3 and 4 are circuit diagrams showing the control and alarm circuits used when feeding detergent to the pump.
Figure 4:
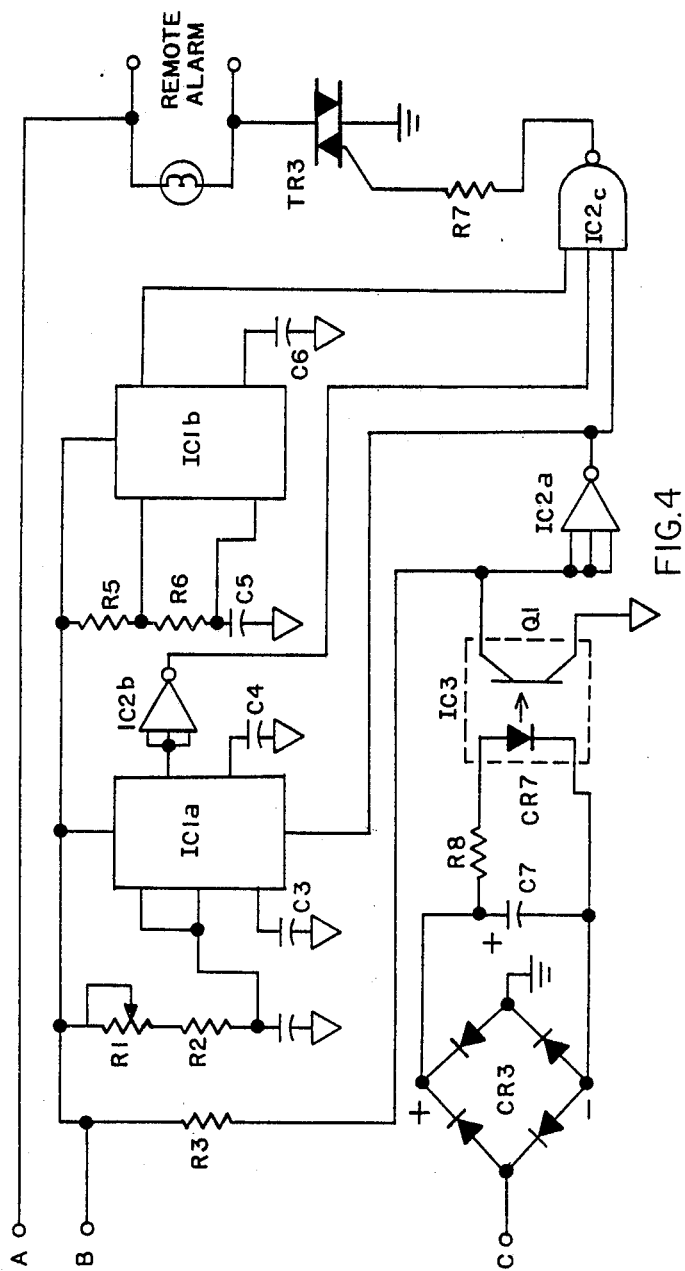

FIGS. 3 and 4 show the circuitry for controlling the detergent feed supply to the peristaltic pump 38 for feeding to the dishwasher. Circuit power is supplied from a 24 VAC input through a switch, S1, and isolation transformer to a potentiometer including resistors R9, R10, R11 and a pre-set resistance R12. The signal is fed to a pulse shaping network consisting of a resistance R13, diode CR4, and an A.C. filter R14, C8 to produce a suitably shaped positive commutative pulse to the SCR (TR1).

When the probe indicates a sufficient amount of solution is present in the tank, it will supply enough resistance to R9, R11 of the potentiometer and turn on the SCR. Output from the SCR is rectified, clipped, limited by CR5 and R15, filtered through C9, R16 and R17, and fed to a triac (TR2) along with power from the 24 VAC transformer. Hence, when the SCR turns on, to indicate a low detergent concentration (i.e. low conductance or pH), or low liquid level if powered detergent is being used, the triac will turn on and actuate the feed lamp signal.

In addition, the triac will actuate the relay 36 from the solenoid valve to feed water, if powdered detergent is employed; alternatively, the relay will be actuated by the triac to pump detergent. In either event, the peristaltic pump to the dishwasher will be turned on. The potentiometer (i.e. R12) is set so that for a pre-selected value such as concentration (e.g. a micromho conductance probe) or a pH probe, a balanced potentiometer will prevent the SCR from firing; consequently pumping will cease.

A.C. voltage from the triac output is fed to a bridge rectifier (CR3's) and through an RC (C7, R8) filter as inverted square wave pulses to a diode emitter CR7 which is optically coupled to a phototransistor Q1; this coupling IC3 minimizes impedance coupling problems.

A first input to a NAND gate IC2c is fed from the phototransistor Q1 and inverter amplifier IC2a as a square wave train. A second input to the NAND gate is from a timing counter IC1a which is fed from the bridge rectifier (CR1's). A third input is also fed to the NAND gate IC2c from the bridge rectifier through a clock counter IC1b. A Zener diode CR2 and capacitor C1 provide ripple and A.C. filtering, and the Zener diode also sets the appropriate voltage level for the IC1a.

The timing counter IC1a is set by adjustment of R1, R2 so that if the probe detection indicates too long a feed time, e.g., in excess of say 5-10 minutes, the NAND output turn-on from the feed lamp and 24 VAC input will fire a triac TR3. This will turn on a remote alarm such as an alarm lamp, audio, etc., to indicate a resupply of detergent liquid or powder is necessary.

We claim:

1. A feed control system for pumping fluids having linear shear rates and non linear shear rates, separately and to-gether, comprising:
   a. a peristaltic pump for feeding detergent to the dishwasher;
   b. an A.C. shaded pole motor for driving the pump, control for actuating the A.C. motor including:
      I. a probe for determining concentration of the detergent; and,
      II. a turn on circuit actuated by the probe, comprising:
         i. an A.C. power supply;
         ii. means for pre-setting the turn on circuit for response ta a specific detergent concentration;
         iii. a turn on switch for admitting pulses from the probe;
         iv. a first bilateral switch for turn on upon actuation by the power supply and pulses from the turn on switch;
         v. solenoid means for turning on the dishwasher when the bilateral switch is turned on;
         vi. detector means for converting signals from the bilateral switch to a pulse train;
         vii. a clock counter for providing pulse signals;
         viii. an adjustable timing counter set for correspondance to detergent feed time;
         ix. gating means for receiving pulses from the detector means, clock counter and timing counter;
         x. a second bilateral switch for turn on by the gating means and A.C. power supply when the probe indicates an excessive detergent feed time determined by setting of the timing counter;
         xi. alarm means for actuation by the second bilateral switch;
   c. a variable speed, D.C. powered shaded pole motor connected to the A.C. motor, and acting as an electromagnetic brake on the A.C. motor; and,
   d. an A.C. to D.C. rectifier for supplying D.C. power to the variable speed motor;
the peristaltic pump being driven by the A.C. motor, whereby a decrease in viscosity of the fluid causes a decrease in rotational force to the constant torque motor and a counterbalancing increase in braking power of the variable speed motor, thereby linearizing the flow of fluid to the peristaltic pump.

2. The feed control system of claim 1, in which the probe is a conductance probe.

3. The feed control system of claim 2, in which the turn on switch is an SCR, and the bilateral switches are triacs.

4. The feed control system of claim 3, comprising optical detector means for converting signals from the first bilateral switch to square waves.

5. The feed control system of claim 1, in which the fluids are fed to within an accuracy of about ±1%-2% of linearity at the rate of about 1-10 ml/min.

6. A turn on circuit for actuation of a device by signals derived from a concentration probe, including:
   I. a probe for determining concentration of a liquid; and,
   II. a turn on circuit actuated by the probe, comprising:
      i. an A.C. power supply;
      ii. means for pre-setting the turn on circuit for response to a specific liquid concentration;
      iii. a turn on switch for admitting pulses from the probe;
      iv. a first bilateral switch for turn on upon actuation by the power supply and pulses from the turn on switch;

v. solenoid means for turning on the device when the bilateral switch is turned on;

vi. detector means for converting signals from the bilateral switch to a pulse train;

vii. a clock counter for providing pulse signals;

viii. an adjustable timing counter set for correspondance to liquid feed time;

ix. gating means for receiving pulses from the detector means, clock counter and timing counter;

x. a second bilateral switch for turn on by the gating means and A.C. power supply when the probe indicates an excessive liquid feed time determined by setting of the timing counter; and, xi. alarm means for actuation by the second bilateral switch.

7. The turn on circuit of claim 6 in which the device is a dishwasher and the liquid is a detergent.

8. The turn on circuit of claim 6, in which the probe is a conductance probe.

9. The turn on circuit of claim 6 in which the turn on switch is an SCR, and the bilateral switches are triacs.

10. The turn on circuit of claim 6 comprising optical detector means for converting signals from the first bilateral switch to square waves.

11. The turn on circuit of claim 6, in which the liquid is fed to within an accuracy of about ±1%–2% of linearity at the rate of about 1–10 ml/min.

* * * * *